US009109869B2

(12) United States Patent
Hirao

(10) Patent No.: US 9,109,869 B2
(45) Date of Patent: Aug. 18, 2015

(54) INTERFEROMETER AND FOURIER-TRANSFORM SPECTROSCOPIC ANALYZER

(75) Inventor: Yusuke Hirao, Takatsuki (JP)

(73) Assignee: KONICA MINOLTA, INC., Tokyo (JP)

( * ) Notice: Subject to any disclaimer, the term of this patent is extended or adjusted under 35 U.S.C. 154(b) by 136 days.

(21) Appl. No.: 13/881,562

(22) PCT Filed: Sep. 6, 2011

(86) PCT No.: PCT/JP2011/070208
§ 371 (c)(1),
(2), (4) Date: Apr. 25, 2013

(87) PCT Pub. No.: WO2012/056813
PCT Pub. Date: May 3, 2012

(65) Prior Publication Data
US 2013/0222790 A1 Aug. 29, 2013

(30) Foreign Application Priority Data
Oct. 28, 2010 (JP) ................................. 2010-242411

(51) Int. Cl.
G01B 11/02 (2006.01)
G01B 9/02 (2006.01)
G01J 3/453 (2006.01)

(52) U.S. Cl.
CPC ........... *G01B 9/02061* (2013.01); *G01J 3/4535* (2013.01)

(58) Field of Classification Search
CPC ........... G01B 9/02028; G01B 9/02061; G01B 9/02071; G01B 2290/60
USPC ......................................................... 356/498
See application file for complete search history.

(56) References Cited

U.S. PATENT DOCUMENTS

| 4,998,256 | A | 3/1991 | Ohshima et al. | |
| 5,923,422 | A * | 7/1999 | Keens et al. | 356/451 |
| 7,292,347 | B2 * | 11/2007 | Tobiason et al. | 356/498 |
| 2002/0126294 | A1 * | 9/2002 | Vishnia et al. | 356/512 |
| 2010/0046348 | A1 | 2/2010 | Iwafuji | |

(Continued)

FOREIGN PATENT DOCUMENTS

| JP | 64-013426 A | 1/1989 |
| JP | 02-253103 A | 10/1990 |
| JP | 03-161986 A | 7/1991 |

(Continued)

OTHER PUBLICATIONS

International Search Report in International Application No. PCT/JP2011/070208 dated Dec. 20, 2011, 2 pages.

*Primary Examiner* — Jonathan Hansen
(74) *Attorney, Agent, or Firm* — Brinks Gilson & Lione

(57) ABSTRACT

An interferometer (1) measures a measuring interference beam, while detecting the position of a moving mirror (16) on the basis of detection results obtained from a reference beam detector (25). In the interferometer, a reference beam source (21) is configured by including a light source (21a) composed of a semiconductor laser device. A reference optical system (20) has a collimating optical system (22) for a reference beam, said collimating optical system converting a laser beam outputted from the reference beam source (21) into a collimated beam, and the collimated beam is diagonally inputted to a fixed mirror (15).

14 Claims, 5 Drawing Sheets

(56) References Cited

U.S. PATENT DOCUMENTS

2011/0032503 A1\* 2/2011 Sasaki ............................ 355/72
2012/0287439 A1 11/2012 Hirao

FOREIGN PATENT DOCUMENTS

| JP | 2010-050137 A | 3/2010 |
| WO | WO 2011/074452 A1 | 6/2011 |

\* cited by examiner

INTERFEROMETER AND FOURIER-TRANSFORM SPECTROSCOPIC ANALYZER

TECHNICAL FIELD

This application is the National Stage Application of International Patent Application No. PCT/JP2011/070208, filed Sep. 6, 2011.

The present invention relates to a Michelson type interferometer and a Fourier-transform spectroscopic analyzer including the interferometer.

BACKGROUND ART

A Michelson dual beam interferometer used in FTIR (Fourier transform infrared spectroscopy) adopts a configuration in which infrared light emitted from a light source is split by a beam splitter into two directions that are toward a stationary mirror and toward a movable mirror, respectively, and a light beam returning after being reflected off the stationary mirror and a light beam returning after being reflected off the movable mirror are combined by the above-described beam splitter into one optical path. When the movable mirror is moved back and forth (in an optical axis direction of incident light), an optical path difference between two light beams obtained by the splitting varies, so that light resulting from combining them is obtained as measurement interference light (interferogram) whose intensity varies with the amount of movement of the movable mirror. The interferogram thus obtained is sampled and subjected to an A/D conversion and to a Fourier transform, whereby a spectral distribution of the incident light can be obtained, and based on this spectral distribution, an intensity of the measurement interference light per wave number (1/wavelength) can be determined.

An interferogram as described above is expressed as a function of a phase difference between the movable mirror and the stationary mirror, i.e. of an optical path difference between reflected light reflected off the movable mirror and reflected light reflected off the stationary mirror, and thus determining an intensity of measurement interference light requires that the position of the movable mirror be constantly monitored. For this reason, typically, in addition to the light source that emits infrared light, a reference light source such as a He—Ne laser or the like is used for the purpose of monitoring the position of the movable mirror. More specifically, reference light emitted from the reference light source is split by the beam splitter into light beams, which are guided to the movable mirror and to the stationary mirror, respectively, and the light beam reflected off the movable mirror and the light beam reflected off the stationary mirror are combined by the beam splitter and guided as reference interference light to a reference light photodetector for position detection. The intensity of reference interference light varies with the position of the movable mirror, and thus by detecting a variation in intensity of reference interference light at the reference light photodetector, a position of the movable mirror can be determined.

By the way, since the above-described beam splitter is configured to split incident light into two light beams at a predetermined splitting ratio (for example, 50:50), when a light beam of reference light obtained by splitting by the beam splitter becomes incident on the stationary mirror to be reflected off it and then becomes incident again on the beam splitter, while a part of the incident light beam is reflected in a direction toward the reference light photodetector, the rest of the incident light beam is transmitted through the beam splitter to become returning light returning toward the reference light source. When the returning light becomes incident on the reference light source, harmonic resonance occurs to destabilize laser oscillation, so that a mode hopping phenomenon occurs to cause a variation in output waveform from the reference light photodetector, eventually making it impossible to determine a position of the movable mirror.

In this connection, for example, in Patent Document 1, on a light emission side of a reference light source, a lens that expands a divergence angle of an incident light beam is disposed. In this configuration, conceivably, the amount of light returning to the reference light source is decreased by the expansion lens, and thus the influence of harmonic resonance is reduced to increase accuracy in detecting a position of a movable mirror.

LIST OF CITATIONS

Patent Literature

Patent Document 1: JP-A-H2-253103 (see page 3, upper right column, lines 14 to 17 and page 5, lower left column, lines 14 to 20)

SUMMARY OF THE INVENTION

Technical Problem

In Patent Document 1, however, a He—Ne laser is used as the reference light source. A He—Ne laser is large-sized, and from the viewpoint of maintaining wavelength stability, size reduction thereof can hardly be achieved. That is, in a configuration using a He—Ne laser as a reference light source as in Patent Document 1, an apparatus itself has an increased size.

Moreover, in order to decrease the amount of returning light, it is required that the expansion lens be disposed on the light emission side of the reference light source, and thus compared with a configuration without an expansion lens, the number of components used is increased. The sensitivities to a temperature and to an impact vibration vary from one component to another, and hence it is likely that an increase in the number of components used leads to the occurrence of errors in an optical system as a whole. Because of the above reasons, there is a demand for a configuration that, without using an expansion lens (i.e. by using collimated light as it is), prevents incidence of returning light on a reference light source.

The present invention has been made to solve the above-described problems and has as its object to provide an interferometer that does not use a He—Ne laser as a reference light source, thus having a compact configuration, and without using an expansion lens, can eliminate returning light to the reference light source, thereby being capable of stable detection of a position of a movable mirror based on a detection result of a reference light photodetector, and a Fourier-transform spectroscopic analyzer including the interferometer.

Solution to the Problem

An interferometer of the present invention includes: a measurement optical system in which measurement light is split by a beam splitter into light beams, which are guided to a movable mirror (a moving mirror) and to a stationary mirror (a fixed mirror), respectively, and the light beam reflected off the movable mirror and the light beam reflected off the stationary mirror are combined by the beam splitter into measurement interference light, which is guided to a measurement light photodetector; and a reference optical system in which reference light from a reference light source is split by the beam splitter into light beams, which are guided to the movable mirror and to the stationary mirror, respectively, and the light beam reflected off the movable mirror and the light beam reflected off the stationary mirror are combined by the beam splitter into reference interference light, which is guided to a reference light photodetector. The interferometer performs measurement of the measurement interference light while, based on a detection result of the reference light photodetector, detecting a position of the movable mirror. The reference light source is constituted by a semiconductor laser or a laser light source that outputs laser light emitted from the semiconductor laser via a waveguide or a fiber. The reference optical system has a collimator optical system for reference light that converts laser light emitted from the reference light source into collimated light, and the collimated light becomes obliquely incident on the stationary mirror.

Advantageous Effects of the Invention

According to the present invention, a reference light source is constituted by a semiconductor laser or a laser light source that is compact compared with a He—Ne laser, and thus even in a case of using a collimator optical system, the collimator optical system can be of a compact size, so that a compact interferometer can be realized.

Furthermore, collimated light as described above becomes obliquely incident on the stationary mirror, and thus even if reference light reflected off the stationary mirror returns toward the reference light source via the beam splitter, incidence of the returning light on the reference light source can be prevented. Thus, without using an expansion lens as used in the conventional technique, by using collimated light as it is, laser oscillation in the reference light source is prevented from being destabilized, so that detection of a position of the movable mirror based on a detection result of the reference light photodetector can be stably performed.

DESCRIPTION OF EMBODIMENT

Based on the appended drawings, one embodiment of the present invention will be described as follows.

[Configuration of Analyzer]

Figure 1:
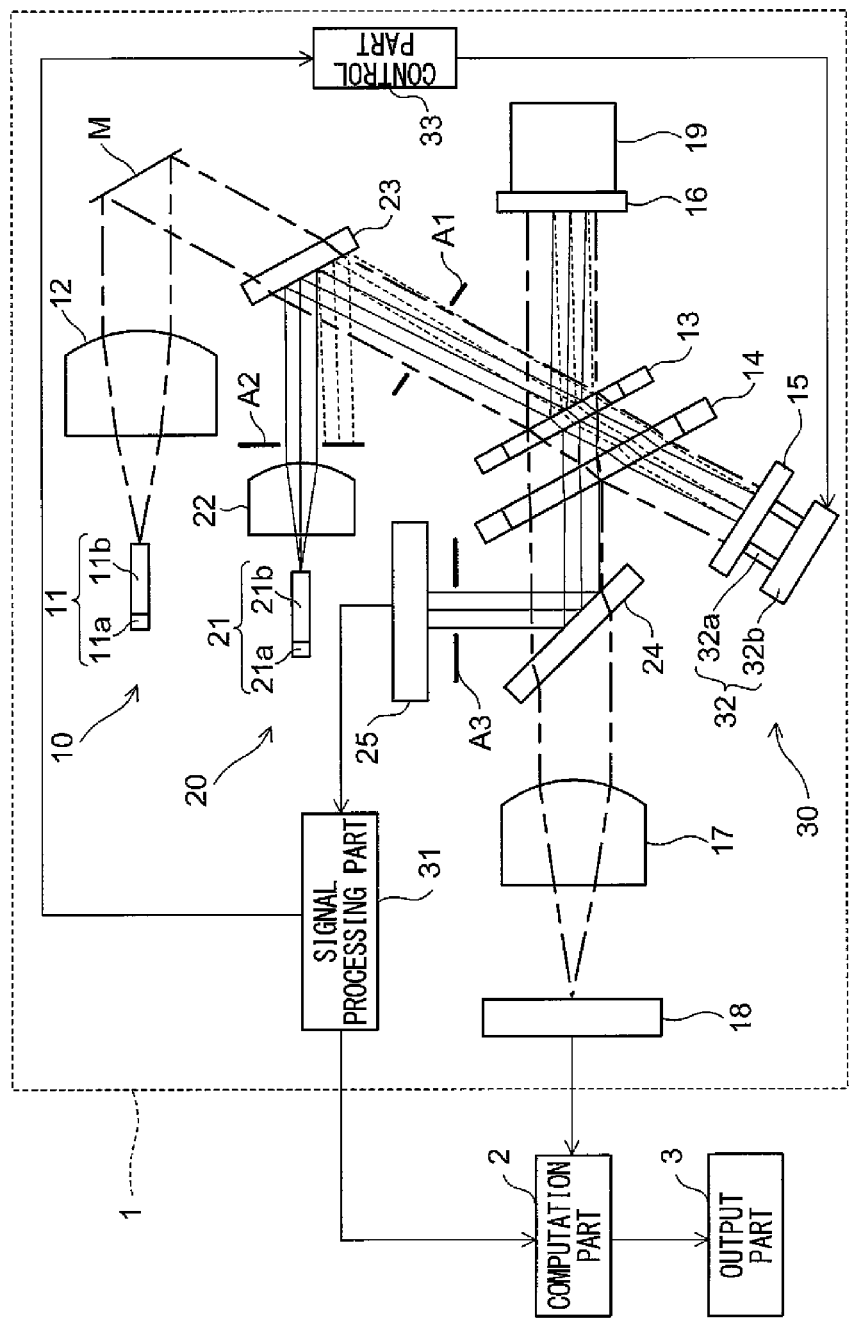
FIG. 1 An explanatory view schematically showing a diagrammatic configuration of a Fourier-transform spectroscopic analyzer of one embodiment of the present invention.

FIG. 1 is an explanatory view schematically showing a diagrammatic configuration of a Fourier-transform spectroscopic analyzer of this embodiment. This analyzer is configured by having an interferometer 1, a computation part 2, and an output part 3. The interferometer 1 is constituted by an optical path bisecting type Michelson interferometer, which will be described in detail later. The computation part 2 performs sampling, an A/D conversion, and a Fourier transform of a signal outputted from the interferometer 1 and thereby generates a spectrum of a wavelength contained in measurement light, namely, a spectrum indicating an intensity of the light per wave number (1/wavelength). The output part 3 outputs (for example, displays) a spectrum generated at the computation part 2. The following describes the interferometer 1 in detail.

The interferometer 1 has a measurement optical system 10, a reference optical system 20, and a correction unit 30, which will be described below in this order.

The measurement optical system 10 includes a light source 11 for measurement, a collimator optical system 12 for measurement light, a folding mirror M, a BS (beam splitter) 13, a compensator 14, a stationary mirror 15, a movable mirror 16, a condenser optical system 17, a measurement light photodetector 18, and a drive mechanism 19. A positional relationship between the stationary mirror 15 and the movable mirror 16 with respect to the BS 13 may be reversed.

The light source 11 for measurement is constituted by, for example, a fiber-coupled optical system composed of a light source 11*a* that emits as measurement light near infrared light or infrared light containing a plurality of wavelengths and an optical fiber 11*b* that is coupled to the light source 11*a*. The light source 11 for measurement may be constituted only by the light source 11*a*. The collimator optical system 12 for measurement light is an optical system that converts measurement light emitted from the light source 11 for measurement into collimated light and guides it to the BS 13, and is constituted by, for example, a collimator lens.

Collimated light described herein conceptually refers to, in addition to perfectly parallel light, substantially parallel light (somewhat convergent or divergent light). That is, the term "collimate" used herein is intended to indicate that light from a light source is guided by a collimator optical system to a sensor via a BS and via a stationary mirror or a movable mirror and thus is not limited to collimation over an infinite distance. Preferably, in order to obtain a plane wave easy to handle, light is collimated over a distance of, for example, not less than 1 m.

The folding mirror M is provided for the purpose of achieving a compact configuration of the interferometer 1 by bending an optical path between the collimator optical system 12 for measurement light and the BS 13. In an optical path between the folding mirror M and the BS 13 (particularly in an optical path between an after-mentioned optical path combining mirror 23 and the BS 13), a stop A1 for restricting a light beam size of measurement light is disposed.

The BS 13 splits incident light, namely, light emitted from the light source 11 for measurement into two light beams and guides them to the stationary mirror 15 and to the movable mirror 16, respectively. The BS 13 further combines the light beams after being reflected off the stationary mirror 15 and off the movable mirror 16, respectively, and outputs light resulting from combining them as measurement interference light. The BS 13 is constituted by a half mirror having a splitting ratio of 50:50.

The compensator 14 is a substrate for compensating for an optical path length corresponding to a thickness of the BS 13 and for an optical path shift due to light being refracted while being transmitted through the BS 13. Depending on how the interferometer 1 is assembled, the need for the compensator 14 can be eliminated.

The condenser optical system 17 is an optical system that condenses light resulting from combining at the BS 13 and emitted therefrom and guides it to the measurement light photodetector 18, and is constituted by, for example, a focusing lens. The measurement light photodetector 18 receives measurement interference light that becomes incident thereon from the BS 13 via the condenser optical system 17 and detects an interferogram (interference pattern).

The drive mechanism 19 is a movement mechanism that moves in parallel (translates) the movable mirror 16 in an optical axis direction so as to cause a variation in difference (difference in optical path length) between an optical path of a light beam reflected off the stationary mirror 15 and an optical path of a light beam reflected off the movable mirror 16 and is constituted by, for example, an electromagnetic type drive mechanism using a VCM (voice coil motor). The drive mechanism 19 may be constituted by a parallel leaf spring type drive mechanism.

In the above-described configuration, measurement light emitted from the light source 11 for measurement is converted by the collimator optical system 12 for measurement light into collimated light. The collimated light then is reflected off the folding mirror M and becomes incident on the BS 13 to be split into two light beams by being partly transmitted through and partly reflected off the BS 13. One of the light beams obtained by the splitting is reflected off the movable mirror 16, while the other is reflected off the stationary mirror 15, and they travel back along their original optical paths, respectively, to be superimposed on each other at the BS 13. Light resulting from the superimposition is transmitted as measurement interference light through the compensator 14 and then is used to irradiate a sample (not shown). At this time, the sample is irradiated with the light while the movable mirror 16 is continuously moved by the drive mechanism 19, and when a difference between optical path lengths from the BS 13 to the mirrors (movable mirror 16, stationary mirror 15) falls on an integral multiple of a wavelength, a maximum intensity of the light resulting from the superimposition is obtained. A difference between the two optical path lengths due to the movable mirror 16 being moved causes a variation in intensity of the light resulting from the superimposition. The light, after being transmitted through the sample, is condensed at the condenser optical system 17 and becomes incident on the measurement light photodetector 18, where it is detected as an interferogram. That is, in FIG. 1, measurement light travels along an optical path indicated by an alternate long and short dashed line.

In the computation part 2, a detection signal (interferogram) from the measurement light photodetector 18 is sampled and subjected to an A/D conversion and to a Fourier transform, whereby a spectrum indicating an intensity of light per wave number is generated. The above-described spectrum is outputted (for example, displayed) at the output part 3, and based on this spectrum, characteristics (a material, a structure, amounts of ingredients, and so on) of the sample can be analyzed.

Next, a description is given of the reference optical system 20 and the correction unit 30. The reference optical system 20 has a configuration partly shared with the above-described measurement optical system 10 and has, in addition to the BS 13, the compensator 14, the stationary mirror 15, and the movable mirror 16 that are described earlier, a reference light source 21, a collimator optical system 22 for reference light, the optical path combining mirror 23, an optical path splitting mirror 24, and a reference light photodetector 25.

The reference light source 21 is a light source for detecting a position of the movable mirror 16 and for generating a timing signal for sampling at the computation part 2, and is constituted by a fiber-coupled optical system composed of a light source 21a that is a semiconductor laser and an optical fiber 21b that is coupled to the light source 21a. That is, the reference light source 21 is constituted by a laser light source that outputs laser light emitted from a semiconductor laser via a fiber or a waveguide. The above-described semiconductor laser emits, for example, red light and it is appropriate that it emit laser light having a wavelength shorter than a shortest wavelength of measurement light (near infrared light, infrared light). The reference light source 21 may be constituted only by the light source 21a.

The collimator optical system 22 for reference light is an optical system that converts reference light (laser light) emitted from the reference light source 21 into collimated light and guides it to the BS 13, and is constituted by, for example, a collimator lens. On a light emission side of the collimator optical system 22 for reference light, a stop A2 is disposed, by which a light beam size of collimated light is restricted. There may be adopted a configuration in which a surface of the lens constituting the collimator optical system 22 for reference light on a light output side thereof is painted black except for an area from which collimated light is emitted so that the function of the stop A2 is imparted to the collimator optical system 22 for reference light.

The optical path combining mirror 23 is a beam combiner that transmits therethrough light from the light source 11 for measurement while reflecting light from the reference light source 21 and thus combines optical paths thereof. In this embodiment, the optical path combining mirror 23 is disposed such that reference light becomes obliquely incident on the stationary mirror 15. This makes an optical path of measurement light and an optical path of reference light not perfectly coaxial with each other. As to reference light becoming obliquely incident on the stationary mirror 15, a detailed description will be given later. The optical path splitting mirror 24 is a beam splitter that transmits therethrough light emitted from the light source 11 for measurement and becoming incident thereon via the BS 13 while reflecting light emitted from the reference light source 21 and becoming incident thereon via the BS 13 and thus splits optical paths thereof.

The reference light photodetector 25 is a photodetector that detects light (reference interference light) emitted from the reference light source 21 to become incident on the optical path splitting mirror 24 via the BS 13 and reflected off it, and is constituted by, for example, a four-division sensor having a response speed faster than that of a CCD. In an optical path between the optical path splitting mirror 24 and the reference light photodetector 25, a stop A3 is disposed, by which a light beam size of reference interference light that becomes incident on the reference light photodetector 25 is restricted.

The description is directed next to the correction unit 30. In the correction unit 30, based on a result of detection of reference interference light at the reference light photodetector 25, an error in relative inclination (a tilt error, an inclination between two optical paths) between reflected light reflected off the movable mirror 16 and reflected light reflected off the stationary mirror 15 is detected, and a correction of the tilt error (tilt correction) is performed by inclining the movable mirror 16 or the stationary mirror 15. If translational mobility of the movable mirror 16 being driven by the drive mechanism 19 is disturbed, a tilt error as described above occurs to cause deterioration in interference intensity (contrast) of measurement interference light. Because of this, by the correction unit 30, the movable mirror 16 or the stationary mirror 15 is inclined so that a tilt error as described above is corrected, and thus deterioration in interference intensity of measurement interference light can be prevented.

Herein, in this embodiment, with the optical path combining mirror 23 disposed as described above, optical axes of measurement light and reference light are disposed so as to be nearly coaxial with each other, though not perfectly so, and thus (1) a tilt error (referred to also as a first tilt error) between a light beam that travels along a route following the light source 11 for measurement, the BS 13, the movable mirror 16, the BS 13, and the measurement light photodetector 18 in this order and a light beam that travels along a route following the light source 11 for measurement, the BS 13, the stationary mirror 15, the BS 13, and the measurement light photodetector 18 in this order is almost approximate to (2) a tilt error (referred to also as a second tilt error) between a light beam that travels along a route following the reference light source 21, the BS 13, the movable mirror 16, the BS 13, and the reference light photodetector 25 in this order and a light beam that travels along a route following the reference light source 21, the BS 13, the stationary mirror 15, the BS 13, and the reference light photodetector 25 in this order. By utilizing this, based on a light reception signal of reference interference light from the reference light photodetector 25, the correction unit 30 detects and corrects the second tilt error, thus allowing the first tilt error to be corrected.

The correction unit 30 described above, more specifically, is configured by having a signal processing part 31, an optical path correction mechanism 32, and a control part 33. The control part 33 is constituted by, for example a CPU and, based on a detection result of the signal processing part 31, controls the optical path correction mechanism 32.

Figure 2:
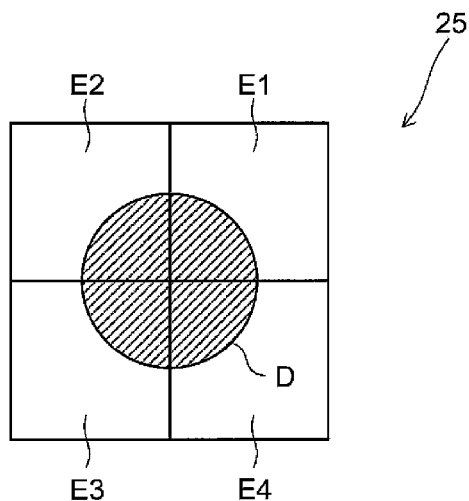
FIG. 2 A plan view showing a diagrammatic configuration of a reference light photodetector of an interferometer adopted in the above-described Fourier-transform spectroscopic analyzer.
Figure 3:
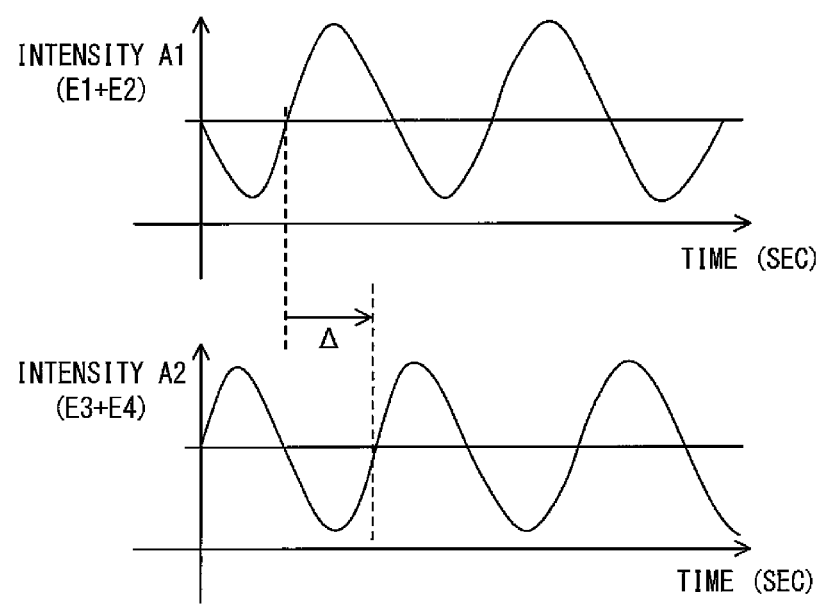
FIG. 3 An explanatory view showing phase signals outputted based on a detection result of the above-described reference light photodetector.

Based on an intensity of reference interference light detected at the reference light photodetector 25, the signal processing part 31 detects a tilt error. For example, as shown in FIG. 2, it is assumed that four light receiving regions (elements constituting the four-division sensor) of the reference light photodetector 25 are indicated, in a counterclockwise order, as E1 to E4, respectively, and an optical spot D of reference interference light is positioned at a center of all the light receiving regions. Where a sum of intensities of light detected in the light receiving regions E1 and E2 is indicated as A1, and a sum of intensities of light detected in the light receiving regions E3 and E4 is indicated as A2, assuming that signals shown in FIG. 3 are obtained as phase signals representing variations in the intensities A1 and A2, respectively, with respect to a lapse of time, based on these signals, a tilt error (particularly, a direction and an amount of a relative inclination of one light relative to the other light) can be detected. In this example, in a direction in which the light receiving regions E1 and E2 are arranged side by side with the light receiving regions E3 and E4 (a vertical direction in FIG. 2), there is occurring a tilt error by an angle corresponding to a phase difference $\Delta$. In FIG. 3, the intensity plotted on the ordinate is shown in relative values. When phase signals obtained are at a slow (low) frequency, an inclination of light between two optical paths can be detected based on an intensity ratio rather than a phase comparison.

The signal processing part 31 also detects, based an intensity of reference interference light detected at the reference light photodetector 25, a position of the movable mirror 16 and functions also as a signal generation part that generates a pulse signal representing timing for sampling. In the reference light photodetector 25, depending on a position of the movable mirror 16 (optical path difference), the intensity of reference interference light as a whole varies between bright and dark, so that based on such a variation in intensity, the signal processing part 31 can detect a position of the movable mirror 16. In synchronization with the sampling timing of the above-described pulse signal, the computation part 2 performs sampling of a detection signal (interferogram) from the measurement light photodetector 18, followed by conversion into digital data.

Based on a tilt error detected at the signal processing part 31, the optical path correction mechanism 32 inclines the movable mirror 16 or the stationary mirror 15 so as to correct an optical path of a light beam reflected off the movable mirror 16 or the stationary mirror 15. In this embodiment, as shown in FIG. 1, the optical path correction mechanism 32 is configured by having a plurality of (at least three) piezoelectric elements 32*a*, each of which is connected at a tip end thereof to a rear surface (a surface on the reverse side to a reflection surface) of the stationary mirror 15 and expands and contracts in an optical axis direction, and a drive portion 32*b* that applies a voltage to each of the piezoelectric elements 32*a* to cause them to expand and contract. Based on a detection result of the signal processing part 31, a voltage to be applied to each of the piezoelectric elements 32*a* is controlled and used to cause them to expand and contract in the optical axis direction, thus allowing an inclination of the stationary mirror 15 (an optical path of reflected light reflected off the stationary mirror 15) to vary, so that a tilt error can be corrected.

In the above-described configuration, light emitted from the reference light source 21 is converted by the collimator optical system 22 for reference light into collimated light and then is reflected off the optical path combining mirror 23 to become incident on the BS 13, where it is split into two light beams. One of the light beams obtained by the splitting at the BS 13 is reflected off the movable mirror 16, while the other is reflected off the stationary mirror 15, and they travel back along their original optical paths, respectively, to be superimposed on each other at the BS 13. Light resulting from the superimposition is transmitted through the compensator 14 to become incident on the optical path splitting mirror 24 and is reflected off it to become incident on the reference light photodetector 25. That is, in FIG. 1, reference light travels along an optical path indicated by a solid line.

As described earlier, based on an intensity of reference interference light detected at the reference light photodetector 25, the signal processing part 31 of the correction unit 30 detects a tilt error, and under control of the control part 33, the optical path correction mechanism 32 adjusts a posture of the stationary mirror 15 (an angle with respect to the BS 13) so that an optical path of reflected light reflected off the stationary mirror 15 is corrected. By performing feedback control in which detection of a tilt error and a correction of an optical path of reflected light (tilt correction) are repeated, a tilt error can be eventually reduced to a level infinitely approximate to zero.

Figure 4:
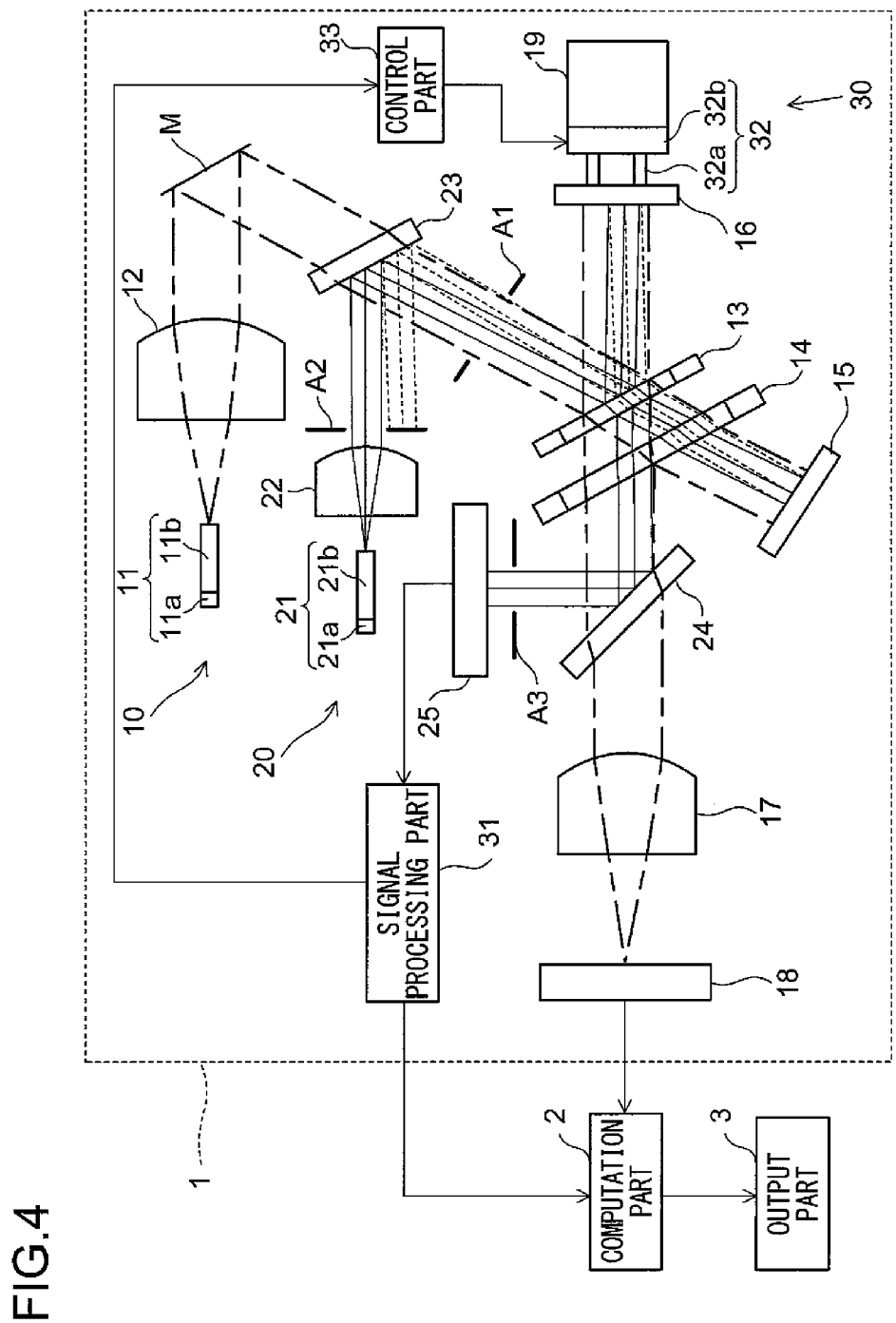
FIG. 4 An explanatory view schematically showing another configuration of the above-described Fourier-transform spectroscopic analyzer.

By the way, FIG. 4 is an explanatory view schematically showing another configuration of the Fourier-transform spectroscopic analyzer. As shown in this figure, the optical path correction mechanism 32 of the correction unit 30 may be configured so that based on a tilt error detected at the signal processing part 31, it corrects an optical path of a light beam reflected off the movable mirror 16. In this case, each of the piezoelectric elements 32a is connected at a tip end thereof to a rear surface of the movable mirror 16, and they are caused to expand and contract by the drive portion 32b so that an inclination of the movable mirror 16 varies, thus allowing an optical path of a light beam reflected off the movable mirror 16 to be corrected. In such a case, it is appropriate that the drive mechanism 19 for moving the movable mirror 16 be connected to a rear surface (the reverse side to the piezoelectric elements 32a) of the drive portion 32b.

[Regarding Parameters]

Tables 1 to 4 show values of parameters used in the interferometer 1 of this embodiment. With reference to Tables 1 to 4, the following further describes the interferometer 1 of this embodiment. Unless otherwise noted, collimated light mentioned in the following description refers to collimated reference light.

TABLE 1

| | Measurement Optical System | Value | Unit |
|---|---|---|---|
| (1) | Light beam size (diameter) | 5 | mm |
| (2) | Shortest wavelength | 900 | nm |
| (3) | Longest wavelength | 2600 | nm |
| (4) | Angle of incidence on stationary mirror | 0 | deg |
| (5) | Amount of movement of movable mirror (Maximum displacement amount) | 3 | mm |

TABLE 2

| | Reference Optical System | Value | Unit |
|---|---|---|---|
| (1) | Light beam size (diameter) | 2 | mm |
| (2) | Wavelength | 658 | nm |
| (3) | Fiber core diameter | 0.0002 | mm |
| (4) | Focal length of collimator optical system | 11 | mm |

TABLE 3

| | Optical Arrangement | Value | Unit |
|---|---|---|---|
| (1) | Distance between reference light collimator optical system (plane vertex) and optical path combiner | 13 | mm |
| (2) | Distance between optical path combiner and BS | 14 | mm |
| (3) | Distance between BS and stationary mirror | 13 | mm |
| (4) | Distance between BS and movable mirror (amplitude center) | 13 | mm |
| (5) | Distance between stop (A2) and optical path combiner | 10 | mm |
| (6) | Distance between folding mirror and optical path combiner | 12 | mm |
| (7) | Distance between BS and optical path splitting mirror | 14 | mm |
| (8) | Distance between optical path splitting mirror and condenser optical system (plane vertex) | 10 | mm |
| (9) | Distance between condenser optical system (plane vertex) and measurement light photodetector | 14 | mm |
| (10) | Distance between beam centers of measurement light and reference light at farthest possible position of movable mirror | 1.45 | mm |

TABLE 4

| | | Value | Unit |
|---|---|---|---|
| (1) | Scan angle range of stationary mirror (movable mirror) | 0.1 | deg |
| (2) | Shift amount of returning light at position of reference light collimator optical system | 2 | mm |
| (3) | Required inclination amount of reference light with respect to stationary mirror | 2.0 | deg |
| (4) | Extra inclination amount due to error in assembling optical components | 0.5 | deg |
| (5) | Angle of incidence of reference light on stationary mirror | 2.5 | deg |

First, in the interferometer 1 of this embodiment, as described earlier, as the reference light source 21, instead of using a He—Ne laser, which has conventionally been used, a light source that is a semiconductor laser is used. A semiconductor laser is compact compared with a He—Ne laser, and thus even in a case of using a collimator optical system, the collimator optical system can be of a compact size. Thus, the interferometer 1 of a compact size can be realized. This is easily understandable also from Table 3 showing that a distance between the movable mirror 16 and the measurement light photodetector 18 is about 5 cm (a sum of items (4), (7), (8), and (9) in Table 3).

Furthermore, in this embodiment, as shown in Table 4, an angle of incidence of collimated light on the stationary mirror 15 is 2.5 degrees, and collimated light, therefore, becomes obliquely incident on the stationary mirror 15. The above-described angle of incidence of 2.5 degrees is set in consideration of a maximum value of an inclination angle (angle detection range) of the stationary mirror 15 inclined by the correction unit 30, which is 0.1 degrees (6 arc minutes), a required angle of oblique incidence of 2.0 degrees, and a margin (extra inclination amount) due to, for example, an error in assembling the members, which is 0.5 degrees.

As described above, collimated light becomes obliquely incident on the stationary mirror 15, so that an optical path of reflected light reflected off the stationary mirror 15 somewhat deviates from an optical path of incident light on the stationary mirror 15, and thus even if a light beam reflected off the stationary mirror 15 returns toward the reference light source 21 via the BS 13, incidence of the returning light on the reference light source 21 can be prevented (see optical paths indicated by broken lines in FIGS. 1 and 4). Thus, without requiring that an expansion lens, which has conventionally been used, be disposed on a light emission side of the reference light source 21, by using collimated light as it is, it is possible to prevent a phenomenon that harmonic resonance occurs to destabilize laser oscillation. As a result, detection of a position of the movable mirror 16 based on a detection result of the reference light photodetector 25 can be stably performed. This allows measurement of measurement interference light at the measurement light photodetector 18 to be stably performed and thus a spectroscopic analysis to be stably performed.

In fact, with respect to a light beam size of 2 mm of reference light (see item (1) in Table 2), at a position on the light output side (the reverse side to the reference light source 21) of the collimator optical system 22 for reference light, a shift amount of returning light in a direction perpendicular to an optical axis is 2 mm (see item (2) in Table 4), and it is understood from this that emission light from the reference light source 21 and returning light do not intersect with each other, and that returning light thus does not become incident on the reference light source 21.

While in this embodiment, collimated light is made obliquely incident on the stationary mirror 15 by adjusting a position (angle) of the optical path combiner 23, collimated light may be made obliquely incident on the stationary mirror 15 by adjusting positions of the reference light source 21 and the collimator optical system 22 for reference light. That is, collimated light may be made obliquely incident on the stationary mirror 15 by placing the reference light source 21 and the collimator optical system 22 for reference light at positions deviating from positions such that reference light becomes incident on the optical path combiner 23 so as to be coaxial with the measurement optical system 10.

Furthermore, in this embodiment, as shown in Table 4, an angle of incidence (2.5 degrees) of collimated light on the stationary mirror 15 is larger than a maximum value (scan angle range of 0.1 degrees) of an inclination angle by which the stationary mirror 15 can be inclined by the correction unit 30 at the time of a tilt correction.

If the above-described condition is not satisfied, even with collimated light becoming obliquely incident on the stationary mirror 15, when the stationary mirror 15 is inclined for a tilt correction, depending on an inclination angle thereof, the collimated light may have an angle of incidence of zero, in which case incidence of returning light on the reference light source 21 cannot be prevented.

Thus, by satisfying the above-described condition, even in a configuration in which the stationary mirror 15 is inclined for a tilt correction, collimated light can always be made obliquely incident on the stationary mirror 15, so that incidence of returning light on the reference light source 21 can be prevented.

Furthermore, in an optical path (for example, in an optical path between the BS 13 and the optical path combining mirror 23), an angle formed by an optical axis of reference light and an optical axis of measurement light is, for example, 2.5 degrees, and in the configuration shown in FIG. 4, this angle is larger than a maximum value (0.1 degrees) of an inclination angle by which the movable mirror 16 can be inclined by the correction unit 30. An optical axis of reference light refers to an optical path along which a central ray of a light beam of reference light travels, and an optical axis of measurement light refers to an optical path along which a central ray of a light beam of measurement light travels.

In the configuration in which a tilt correction is performed by inclining the movable mirror 16, if the above-described condition is not satisfied, even with collimated light becoming obliquely incident on the stationary mirror 15 and on the movable mirror 16, when the movable mirror 16 is inclined in a particular direction (a direction in which at an after-mentioned farthest possible position of the movable mirror 16, a beam center of measurement light and a beam center of reference light are aligned) for a tilt correction, depending on an inclination angle thereof, the collimated light may have an angle of incidence of zero, in which case incidence of returning light on the reference light source 21 cannot be prevented. That is, returning light becomes incident on the reference light source 21 to cause a chaotic behavior, which makes it impossible to detect a signal at the reference light photodetector 25.

By satisfying the above-described condition, however, even when the movable mirror 16 is inclined in a particular direction for a tilt correction, oblique incidence of collimated light on the stationary mirror 15 and on the movable mirror 16 can be realized, and thus incidence of returning light on the reference light source 21 can be prevented.

Figure 5A:
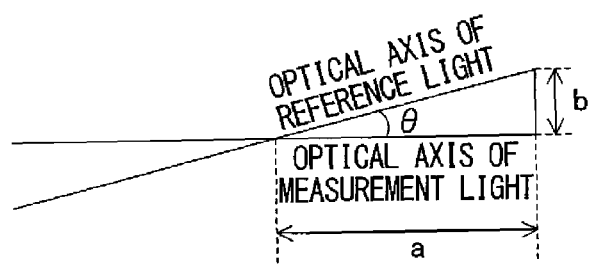
FIG. 5(*a*) is an explanatory view schematically showing an angle formed by an optical axis of reference light and an optical axis of measurement light in a case where both the above-described optical axes intersect with each other, and FIG. 5(*b*) is an explanatory view schematically showing an angle formed by an optical axis of reference light and an optical axis of measurement light in a case where both the above-described optical axes do not intersect with each other.

FIG. 5(a) schematically shows an angle θ formed by an optical axis of reference light and an optical axis of measurement light in a case where in an optical path between the BS 13 and the optical path combining mirror 23, both the above-described optical axes intersect with each other. In a case where the movable mirror 16 is inclined by the correction unit 30, FIG. 5(a) corresponds to the configuration shown in FIG. 4, and in a case where the stationary mirror 15 is inclined by the correction unit 30, this figure corresponds to the configuration shown in FIG. 1. The optical axis of the reference light and the optical axis of the measurement light may intersect with each other at the position of the stop A1 or at any other position. Furthermore, the optical axis of the reference light and the optical axis of the measurement light may be in a positional relationship in which they intersect with each other in a common plane or in a positional relationship in which they are twisted with respect to each other. In the latter case, as an angle formed by the optical axis of the reference light and the optical axis of the measurement light, an angle in a first direction and an angle in a second direction perpendicular to the first direction may be considered.

Assuming that, when the movable mirror 16 is at a most distant possible position (referred to also as a farthest possible position) from the BS 13, a distance from a point of intersection between both the above-described optical axes to the farthest possible position of the movable mirror 16 is indicated as a (mm), and a distance at the above-described position between a light beam center of the measurement light and a light beam center of the reference light is indicated as b (mm), angle $\theta = \tan^{-1}$ (b/a) is established. In the configuration shown in FIG. 4, a=20 mm and b=0.87 mm, and the angle θ, therefore, is given as angle $\theta = \tan^{-1}$ (b/a)=2.5 degrees.

In the case where both the above-described optical axes intersect with each other, preferably, an angle corresponding to a ratio b/a, namely, $\tan^{-1}$ (b/a) is larger than a maximum value of an inclination angle by which the movable mirror 16 can be inclined by the correction unit 30. Also by satisfying this condition, oblique incidence of collimated light on the stationary mirror 15 and on the movable mirror 16 can be realized, and thus there can be obtained an effect of preventing incidence of returning light on the reference light source 21. In the above-described example, the angle (2.5 degrees) corresponding to the ratio b/a is larger than the maximum value (0.1 degrees) of an inclination angle of the movable mirror 16, and the above-described condition, therefore, is satisfied.

Figure 5B:
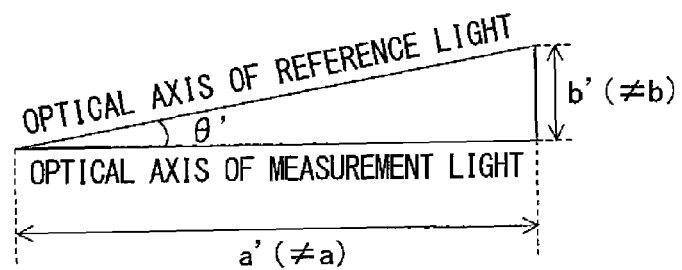

Furthermore, FIG. 5(b) schematically shows an angle θ' formed by an optical axis of reference light and an optical axis of measurement light in a case where in an optical path between the BS 13 and the optical path combining mirror 23, both the above-described optical axes do not intersect with each other. In the case where both the above-described optical axes do not intersect with each other, the following condition may be satisfied. That is, assuming that, when the movable mirror 16 is at a most distant possible position (a farthest possible position) from the BS 13, a distance from the collimator optical system 22 for reference light to the farthest possible position of the movable mirror 16 is indicated as a' (mm), and a distance at the above-described position between a light beam center of the measurement light and a light beam center of the reference light is indicated as b' (mm), it is appropriate that an angle corresponding to a ratio b'/a', namely, $\tan^{-1}$ (b'/a') be larger than a maximum value of an inclination angle by which the movable mirror 16 can be inclined by the correction unit 30. Also in this case, oblique incidence of collimated light on the stationary mirror 15 and on the movable mirror 16 can be realized, and thus there can be obtained the effect of preventing incidence of returning light on the reference light source 21.

That is, an angle formed by an optical axis of reference light and an optical axis of measurement light is expressed in some case by $\tan^{-1}$ (b/a) and in some other case by $\tan^{-1}$ (b'/a'), in either of which cases, when the angle formed by both the above-described optical axes is larger than a maximum value of an inclination angle by which the movable mirror 16 can be inclined by the correction unit 30, incidence of returning light on the reference light source 21 can be prevented. It is appropriate that the angle formed by both the above-described optical axes be set in consideration of an error (0.5 degrees) in assembling the components, and the angle can be set to a value in a range of, for example, 0.5 to 2.5 degrees.

Furthermore, in the configuration shown in FIG. 1 in which a tilt correction is performed in a manner in which the correction unit 30 inclines the stationary mirror 15, it is appropriate that, in an optical path between the BS 13 and the optical path combining mirror 23, an angle formed by an optical axis of reference light and an optical axis of measurement light be larger than a maximum value of an inclination angle by which the stationary mirror 15 can be inclined by the correction unit 30. In the configuration shown in FIG. 1, the angle formed by an optical axis of reference light and an optical axis of measurement light is, for example, 2.5 degrees, with the maximum value of an inclination angle of the stationary mirror 15 being 0.1 degrees, and the above-described condition, therefore, is satisfied.

In the configuration in which a tilt correction is performed by inclining the stationary mirror 15, if the above-described condition is not satisfied, even with collimated light becoming obliquely incident on the stationary mirror 15, when the stationary mirror 15 is inclined in a particular direction (a direction in which at a position of the stationary mirror 15, a beam center of measurement light and a beam center of reference light are aligned) for a tilt correction, depending on an inclination angle thereof, the collimated light may have an angle of incidence of zero, in which case incidence of returning light on the reference light source 21 cannot be prevented, causing a chaotic behavior, which makes it impossible to detect a signal at the reference light photodetector 25.

By satisfying the above-described condition, however, even when the stationary mirror 15 is inclined in a particular direction for a tilt correction, oblique incidence of collimated light on the stationary mirror 15 can be realized, and thus incidence of returning light on the reference light source 21 can be prevented.

Furthermore, as a result of becoming obliquely incident on the stationary mirror 15, collimated light becomes obliquely incident also on the movable mirror 16. At this time, preferably, an angle of incidence of the collimated light on the stationary mirror 15 is not more than a maximum value of an inclination angle by which, within a light beam of measurement light that becomes incident on the movable mirror 16 when positioned at a most distant possible position (farthest possible position) from the BS 13, the collimated light becoming incident on the movable mirror 16 is inclined. That is, an upper limit of an angle of incidence of collimated light on the stationary mirror 15 is equal to a maximum value of an angle by which, within a light beam of measurement light that becomes incident on the movable mirror 16 when positioned at the farthest possible position, the collimated light can be inclined.

In a case where the above-described condition is satisfied, even with collimated light (reference light) becoming obliquely incident on the stationary mirror 15 and becoming obliquely incident also on the movable mirror 16, the collimated light can be propagated along an optical path equivalent to an optical path of measurement light. Thus, a variation in position of the movable mirror 16 at the time of measurement of measurement interference light can be reliably detected at the reference light photodetector 25.

When a light beam size of measurement light is smaller than 1 mm, laser light diverges through diffraction, so that an optical system can hardly be built. Furthermore, when a light beam size of measurement light is larger than 10 mm, it is required that the movable mirror 16 be manufactured to have a reflection surface with an effective diameter larger than 10 mm. A large-sized reflection surface can hardly be maintained at a high level of surface accuracy, making it difficult to manufacture the movable mirror 16. In view of the above, preferably, a light beam size of measurement light is set to not less than 1 mm and not more than 10 mm.

Furthermore, it is assumed that, when the movable mirror 16 is at a most distant possible position (farthest possible position) from the BS 13, a distance from the collimator optical system 12 for measurement light to the farthest possible position of the movable mirror 16 is indicated as f (mm), and a light beam size (diameter) of light collimated at the collimator optical system 12 for measurement light is indicated as e (mm). The distance f is equal to the distance from the collimator optical system 22 for reference light to the farthest possible position of the movable mirror 16, having a value of 4105 mm (a sum of items (1), (2), and (4) in Table 3+a half of a displacement amount in item (5) in Table 1), and e=5 mm (see item (1) in Table 1). An angle corresponding to a ratio e/f, namely, $\tan^{-1}$ (e/f), therefore, is 6.87 degrees, and thus it can be said that an angle of incidence (2.5 degrees) of collimated light (reference light) on the stationary mirror 15 is smaller than the angle corresponding to the ratio e/f.

In a case where, as described above, an angle of incidence of collimated light on the stationary mirror 15 is smaller than an angle corresponding to the ratio e/f, on the reflection surface (for example, the reflection surface of the stationary mirror 15), a light beam of reference light impinges within a region defined by a light beam size of measurement light. That is, measurement light and reference light are reflected within a common region on the reflection surface. This allows information on measurement light to be measured by using reference light.

Furthermore, a light beam size of reference light converted into collimated light by the collimator optical system 22 for reference light is 2 mm (see item (1) in Table 2) and, therefore, is smaller than a light beam size of 5 mm (see item (1) in Table 1) of measurement light converted into collimated light by the collimator optical system 12 for measurement light.

When a light beam size of reference light is large, the sensitivity of the reference light photodetector 25 to a tilt error is increased to such an extent that, in response even to a slight tilt error, the number of interference fringes generated due thereto and detected at the reference light photodetector 25 is increased. This makes it impossible for the correction unit 30 to detect a tilt error based on a result of detection of reference interference light at the reference light photodetector 25.

By setting a light beam size of reference light to be smaller than a light beam size of measurement light, however, the sensitivity to a tilt error can be made lower at the reference optical system 20 than at the measurement optical system 10, and thus an increase in number of interference fringes generated due to a tilt error at the reference optical system 20 can be suppressed. Thus, even in a case of a significant tilt error due to an external vibration or an impact, based on a result of detection of reference interference light at the reference light photodetector 25, the correction unit 30 can reliably detect the tilt error.

[Regarding Correction of Sampling Timing]

In this embodiment, since reference light becomes obliquely incident on the stationary mirror 15 and on the movable mirror 16, compared with a configuration in which reference light becomes perpendicularly incident on them, the position of the movable mirror 16 at which a maximum interference intensity of reference light is obtained deviates. That is, when the movable mirror is at a position different from a position at which an optical path difference falls on an integral multiple of a wavelength of reference light, a maximum interference intensity of the reference light is obtained. This equivalently means that there occurs an apparent variation in wavelength of the reference light (laser oscillation wavelength). As a result, a pulse (sampling timing) of a signal that the signal processing part 31 generates based on a detection result of the reference light photodetector 25 also deviates from a normal pulse (timing at which an optical path difference falls on an integral multiple of a wavelength of reference light).

Figure 6:
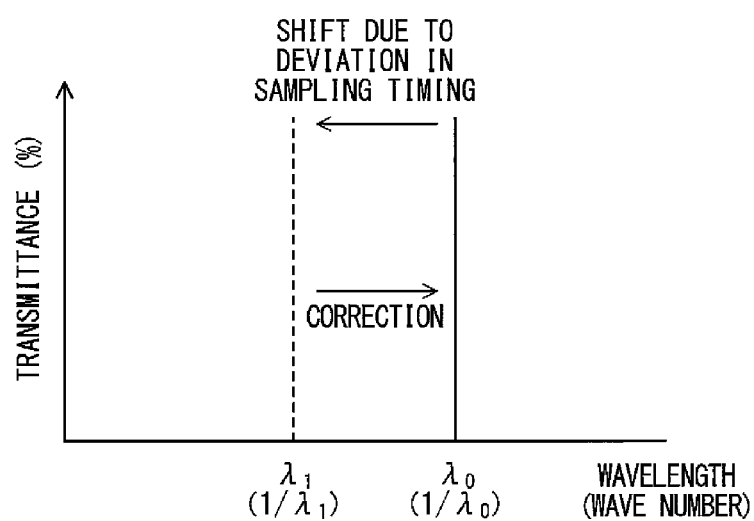
FIG. 6 is an explanatory view showing a spectrum obtained after a Fourier transform of measurement interference light in a case where light having a particular wavelength is used as measurement light.

Herein, in a case where light having a particular wavelength $\lambda_0$ (emission line spectrum) is used as measurement light, if sampling timing deviates from normal timing, a spectrum obtained by subjecting an interferogram of measurement interference light to a Fourier transform at the computation part 2 appears in a state where, as shown in FIG. 6, a transmittance peak (intensity peak) of the particular wavelength $\lambda_0$ (wave number $1/\lambda_0$) is shifted to a wavelength $\lambda_1$ (wave number $1/\lambda_1$). Thus, a deviation in sampling timing can be easily grasped by determining a deviation of the wavelength $\lambda_1$ from the particular wavelength $\lambda_0$.

By utilizing this, in this embodiment, based on a deviation of the wavelength $\lambda_0$ from the particular wavelength $\lambda_0$, the computation part 2 performs a correction of sampling timing. Thus, even in a configuration in which reference light becomes obliquely incident on the stationary mirror 15, an apparent variation in laser oscillation wavelength as described above can be suppressed, allowing a Fourier transform of an interferogram sampled at appropriate timing, so that a spectroscopic analysis can be performed with high accuracy.

[Regarding Wavelength Bands of Measurement Light and Reference Light]

Materials of many types often have absorption bands in a near infrared light region and an infrared light region that are referred to as a fingerprint region, which is why a spectroscopic analysis is often performed by using near infrared light and infrared light. In such a spectroscopic analysis, an antireflection coating (AR coating) is often applied to a light transmission surface (for example, a light transmission surface of the BS 13) in each of the measurement optical system 10 and the reference optical system 20 so that light use efficiency is enhanced.

In this case, from the viewpoint of designing an antireflection coating, an antireflection characteristic with respect to a wide band can hardly be imparted thereto. Furthermore, antireflection with respect to a wide wavelength band results in a decrease in reflectance with respect to that wavelength band. For this reason, in a case where near infrared light or infrared light is used as measurement light, red light (red semiconductor laser light) is used as reference light so that the reference light and the measurement light have wavelength bands approximate to each other, and thus designing of an antireflection coating can be facilitated.

Furthermore, though from the viewpoint of optical designing, the BS 13 can hardly be configured to have a predetermined splitting ratio (for example, 50:50) with respect to a wide wavelength range, by setting measurement light and reference light to have wavelength bands approximate to each other as described above, designing of a beam splitter having a predetermined splitting ratio can be facilitated.

[Additional Remarks]

As to how coupling to the fibers is performed, while it is determined depending on a NA and a core diameter of a fiber at an end thereof, the most efficient form of coupling is butt coupling that provides a coupling magnification of 1:1. Hence, in a case of an analogous model using a thin lens, a condition under which light does not return to an output opening of a laser light source is determined depending on a fiber core radius size d (mm) and a distance L (mm) from a principal point position of a collimator lens and a reflection surface thereof. That is, by making collimated light obliquely incident on a stationary mirror at an angle of incidence of not less than an angle $\phi$ (rad) corresponding to d/L, an influence of returning light to the laser light source can be eliminated. For example, assuming that the distance from the principal point position of the lens to the reflection surface thereof is L=30 (mm), and the radius size of the output opening of the laser light source is d=0.012 (mm), a required inclination angle (angle of incidence on the stationary mirror) $\phi$ of collimated light at which an influence of returning light can be eliminated is $\phi$=0.004 (rad)=1.37 (arcmin).

In this embodiment, preferably, the reference light source 21 is a laser that includes a band narrowing element and has a long coherence length and whose wavelength variation with a temperature variation is small. In this case, by performing temperature control with respect to the reference light source 21, a wavelength variation thereof can be suppressed to a considerably low level to bring about stability, and thus a compact and stable coherent light source can be realized. As a result, in measurement using the interferometer 1 of this embodiment, a stable measurement result can be obtained.

Herein, as the above-described band narrowing element, preferably used is an element that has a function of transmitting therethrough a part of light emitted by the reference light source 21 and reflecting a part of the light by narrowing a spectral line width, more specifically, a diffraction grating such as a VHG (volume holographic grating), a FBG (fiber grating), or the like. In such a diffraction grating, a part of coherent light having an emission wavelength becomes reflected diffraction light, which is guided to an active layer of the semiconductor laser to cause an induced emission, and thus the emission wavelength can be locked to a wavelength of the reflected diffraction light. The wavelength of the reflected diffraction light is restricted to a width determined depending on the diffraction grating, and thus a spectral line of an emission wavelength of the semiconductor laser is fixed to a particular mode, so that a bandwidth is narrowed.

While this embodiment describes a configuration in which the interferometer 1 incorporates therein the light source 11 for measurement, and measurement interference light is obtained by using measurement light emitted from the light source 11 for measurement, it is not necessarily required that the interferometer 1 of this embodiment incorporate therein the light source 11 for measurement. That is, measurement light used to obtain measurement interference light may be light emitted from a light source incorporated in an interferometer or light that becomes incident from outside an interferometer.

Thus, the interferometer of this embodiment is applicable to any of, for example, (1) a case where a sample is irradiated with light outside the interferometer, and the light after passing through the sample is made incident on the interferometer and used for a spectroscopic analysis, (2) a case where in the interferometer, interference light is generated by using light introduced from outside the interferometer, and a spectroscopic analysis is performed by irradiating a sample with the interference light, and (3) a case where light itself that becomes incident from outside the interferometer is used as a subject of an analysis.

As discussed in the foregoing, the interferometer of this embodiment has a configuration including a measurement optical system in which measurement light is split by a beam splitter into light beams, which are guided to a movable mirror and to a stationary mirror, respectively, and the light beam reflected off the movable mirror and the light beam reflected off the stationary mirror are combined by the beam splitter into measurement interference light, which is guided to a measurement light photodetector, and a reference optical system in which reference light from a reference light source is split by the beam splitter into light beams, which are guided to the movable mirror and to the stationary mirror, respectively, and the light beam reflected off the movable mirror and the light beam reflected off the stationary mirror are combined by the beam splitter into reference interference light, which is guided to a reference light photodetector. The interferometer performs measurement of the measurement interference light while, based on a detection result of the reference light photodetector, detecting a position of the movable mirror. The reference light source is constituted by a semiconductor laser or a laser light source that outputs laser light emitted from the semiconductor laser via a waveguide or a fiber. The reference optical system has a collimator optical system for reference light that converts laser light emitted from the reference light source into collimated light, and the collimated light becomes obliquely incident on the stationary mirror.

According to the above-described configuration, the reference light source constituted by a semiconductor laser or a laser light source is compact compared with a He—Ne laser commonly used as reference light source, and even in a case of using a collimator optical system, the collimator optical system can of a compact size, so that a compact interferometer can be realized.

Furthermore, collimated light becomes obliquely incident on the stationary mirror, so that an optical path of reflected light reflected off the stationary mirror somewhat deviates from an optical path of incident light on the stationary mirror. Thus, even if reference light reflected off the stationary mirror returns toward the reference light source via the beam splitter, incidence of the returning light on the reference light source (particularly, a light output portion) can be prevented. Thus, without requiring that an expansion lens be disposed on a light emission side of the reference light source (by using collimated light as it is), it is possible to prevent a phenomenon that harmonic resonance occurs to destabilize laser oscillation, so that detection of a position of the movable mirror based on a detection result of the reference light photodetector can be stably performed.

Preferably, the interferometer of this embodiment further includes a correction unit that, based on a detection result of the reference light photodetector, detects an error in relative inclination between reflected light reflected off the movable mirror and reflected light reflected off the stationary mirror and corrects the error by inclining the movable mirror or the stationary mirror. Further, an angle of incidence of the collimated light on the stationary mirror is larger than a maximum value of an inclination angle by which the movable mirror or the stationary mirror can be inclined by the correction unit.

In this configuration, even when the movable mirror or the stationary mirror is inclined by the correction unit for a correction of an error in inclination between two optical paths (tilt correction), in no case does an angle of incidence of collimated light on the stationary mirror become zero (perpendicular incidence). Thus, even in a configuration in which a tilt correction is performed by the correction unit, collimated light can always be made obliquely incident on the stationary mirror, so that incidence of returning light on the reference light source can be prevented.

Preferably, in the interferometer of this embodiment, the correction unit corrects an error in relative inclination between reflected light reflected off the movable mirror and reflected light reflected off the stationary mirror by inclining the movable mirror, and an angle formed by an optical axis of the reference light and an optical axis of the measurement light is larger than a maximum value of an inclination angle by which the movable mirror can be inclined by the correction unit.

In a configuration in which a tilt correction is performed in a manner in which the movable mirror is inclined by the correction unit, by satisfying the above-described condition, even when the movable mirror is inclined in a particular direction, incidence of returning light on the reference light source can be prevented.

Preferably, in the interferometer of this embodiment, the correction unit corrects an error in relative inclination between reflected light reflected off the movable mirror and reflected light reflected off the stationary mirror by inclining the stationary mirror, and an angle formed by an optical axis of the reference light and an optical axis of the measurement light is larger than a maximum value of an inclination angle by which the stationary mirror can be inclined by the correction unit.

In a configuration in which a tilt correction is performed in a manner in which the stationary mirror is inclined by the correction unit, by satisfying the above-described condition, even when the stationary mirror is inclined in a particular direction, incidence of returning light on the reference light source can be prevented.

Preferably, in the interferometer of this embodiment, an angle of incidence of the collimated light on the stationary mirror is not more than a maximum value of an inclination angle by which, within a light beam of the measurement light that becomes incident on the movable mirror when positioned at a most distant possible position from the beam splitter, the collimated light becoming incident on the movable mirror is inclined.

In this case, even in a configuration in which collimated light becomes obliquely incident on the stationary mirror, the collimated light can be propagated along an optical path equivalent to an optical path of measurement light, and thus a variation in position of the movable mirror at the time of measurement of measurement interference light can be reliably detected at the reference light photodetector.

Preferably, in the interferometer of this embodiment, the measurement optical system has a collimator optical system for measurement light that converts the measurement light into collimated light. Further, assuming that, when the movable mirror is at a most distant possible position from the beam splitter, a distance from the collimator optical system for measurement light to the position of the movable mirror is indicated as f, and a light beam size of light collimated at the collimator optical system for measurement light is indicated as e, an angle of incidence of collimated light of the reference optical system on the stationary mirror is smaller than an angle corresponding to a ratio e/f.

In a case where the above-described condition is satisfied, on a reflection surface (for example, a reflection surface of the stationary mirror), a light beam of reference light impinges within a region defined by a light beam size of measurement light, and the measurement light and the reference light, therefore, are reflected within the common region on the reflection surface, so that information on the measurement light can be measured by using the reference light.

In the interferometer of this embodiment, the correction unit may include a signal processing part that, based on a detection result of the reference light photodetector, detects an error in relative inclination between reflected light reflected off the movable mirror and reflected light reflected off the stationary mirror, an optical path correction mechanism that corrects an optical path of light reflected off the movable mirror or the stationary mirror by inclining the movable mirror or the stationary mirror, and a control part that, based on the error in inclination detected at the signal processing part, controls the optical path correction mechanism.

Based on a tilt error detected at the signal processing part, the control part controls the optical path correction mechanism, and the optical path correction mechanism corrects an optical path of reflected light reflected off the movable mirror or the stationary mirror, so that a tilt correction can be reliably performed.

Preferably, in the interferometer of this embodiment, the reference light photodetector is constituted by a division sensor, and based on an output from each of elements constituting the division sensor, the correction unit detects an error in relative inclination between reflected light of the measurement light reflected off the movable mirror and reflected light of the measurement light reflected off the stationary mirror.

Based on an output (for example, a phase difference) from each of the elements constituting the division sensor, the correction unit can detect a direction and an amount of an inclination of one light relative to the other light, and based on a result of the detection, a tilt correction can be reliably performed.

Preferably, in the interferometer of this embodiment, the measurement optical system has a collimator optical system for measurement light that converts the measurement light into collimated light, and a light beam size of reference light converted into collimated light by the collimator optical system for reference light is smaller than a light beam size of measurement light converted into collimated light by the collimator optical system for measurement light.

In this configuration, the sensitivity to an error in relative inclination (tilt error) between reflected light reflected of the stationary mirror and reflected light reflected off the movable mirror in the reference optical system can be made lower than the sensitivity to a tilt error in the measurement optical system, and thus an increase in number of interference fringes generated due to a tilt error at the reference light photodetector can be suppressed. Thus, even in a case of a significant tilt error due to an external vibration or an impact, based on a detection result of the reference light photodetector in the reference optical system, the correction unit can reliably detect the tilt error.

Preferably, the Fourier-transform spectroscopic analyzer of this embodiment includes the earlier described interferometer of this embodiment and a computation part that performs sampling and a Fourier transform of an interferogram obtained as a result of the measurement light photodetector of the interferometer receiving the measurement interference light and thereby generates a spectrum of a wavelength contained in the measurement light.

As described earlier, according to the interferometer of this embodiment, laser oscillation is prevented from being destabilized due to returning light, and thus detection of a position of the movable mirror can be stably performed. Thus, in a Fourier-transform spectroscopic analyzer (FTIR) in which an interferogram obtained at a measurement light photodetector of such an interferometer is sampled and subjected to a Fourier transform at a computation part, a spectroscopic analysis based on detection of a position of a movable mirror can be stably performed.

Preferably, in the Fourier-transform spectroscopic analyzer of this embodiment, the interferometer further includes a signal generation part that, based on a detection result of the reference light photodetector in the reference optical system, generates a signal representing timing for sampling the interferogram. Further, based on, with respect to an interferogram of measurement interference light obtained in a case where light having a particular wavelength is used as the measurement light, a deviation from the particular wavelength of a wavelength obtained by performing sampling of the interferogram at timing based on a signal from the signal generation part, followed by a Fourier transform, the computation part corrects the timing for sampling.

In the interferometer of this embodiment, since reference light becomes obliquely incident on the stationary mirror (and the movable mirror), when the movable mirror is at a position deviating from a position at which an optical path difference falls on an integral multiple of a wavelength of the reference light, a maximum interference intensity of the reference light is obtained. This equivalently means that there occurs an apparent variation in wavelength of the reference light. As a result, sampling timing of a signal generated based on a detection result of the reference light photodetector also deviates from normal timing.

Such a deviation in sampling timing, however, can be easily grasped by determining a deviation from a particular wavelength of a wavelength obtained in a case where light having the particular wavelength (emission line spectrum) is used as measurement light, and an interferogram of measurement interference light is subjected to a Fourier transform. Thus, based on such a deviation from a particular wavelength of a wavelength obtained after a Fourier transform, sampling timing is corrected, and thus even in a configuration in which reference light becomes obliquely incident on the stationary mirror, an apparent variation in laser oscillation wavelength is suppressed, so that a spectroscopic analysis can be performed with high accuracy.

Preferably, in the Fourier-transform spectroscopic analyzer of this embodiment, the measurement light is near infrared light or infrared light, and the reference light is red light.

Since measurement light and reference light have wavelength bands approximate to each other, even in a case where an antireflection coating is applied to a light transmission surface of the beam splitter so that light use efficiency is enhanced, a wavelength band with respect to which antireflection is required can be narrowed, and thus designing of an antireflection coating can be facilitated.

Industrial Applicability

The present invention is applicable to a Michelson type interferometer and a Fourier-transform spectroscopic analyzer that performs a spectroscopic analysis by using the same.

LIST OF REFERENCE SYMBOLS

1 interferometer
2 computation part
10 measurement optical system
11 light source for measurement
12 collimator optical system for measurement light
13 BS (beam splitter)

15 stationary mirror
16 movable mirror
18 measurement light photodetector
20 reference optical system
21 reference light source
22 collimator optical system for reference light
25 reference light photodetector
30 correction unit
31 signal processing part (correction unit, signal generation part)
32 optical path correction device (correction unit)
33 control part (correction unit)

The invention claimed is:

1. An interferometer, comprising:
a measurement optical system in which measurement light from a measurement light source is split by a beam splitter into light beams, which are guided to a movable mirror and to a stationary mirror, respectively, and the light beam reflected off the movable mirror and the light beam reflected off the stationary mirror are combined by the beam splitter into measurement interference light, which is guided to a measurement light photodetector; and
a reference optical system in which reference light from a reference light source is split by the beam splitter into light beams, which are guided to the movable mirror and to the stationary mirror, respectively, and the light beam reflected off the movable mirror and the light beam reflected off the stationary mirror are combined by the beam splitter into reference interference light, which is guided to a reference light photodetector,
the interferometer performing measurement of the measurement interference light while, based on a detection result of the reference light photodetector, detecting a position of the movable mirror,
wherein
the reference light source is constituted by a semiconductor laser or a laser light source that outputs laser light emitted from the semiconductor laser via a waveguide or a fiber,
the reference optical system has a collimator optical system for reference light that converts laser light emitted from the reference light source into collimated light, and
the collimated light becomes obliquely incident on the stationary mirror such that an optical path of the measurement light and an optical path of the reference light are not perfectly coaxial with each other.

2. The interferometer according to claim 1, further comprising:
a correction unit that, based on a detection result of the reference light photodetector, detects an error in relative inclination between reflected light reflected off the movable mirror and reflected light reflected off the stationary mirror and corrects the error by inclining the movable mirror or the stationary mirror,
wherein an angle of incidence of the collimated light on the stationary mirror is larger than a maximum value of an inclination angle by which the movable mirror or the stationary mirror can be inclined by the correction unit.

3. The interferometer according to claim 2, wherein
the correction unit corrects an error in relative inclination between reflected light reflected off the movable mirror and reflected light reflected off the stationary mirror by inclining the movable mirror, and
an angle formed by an optical axis of the reference light and an optical axis of the measurement light is larger than a maximum value of an inclination angle by which the movable mirror can be inclined by the correction unit.

4. The interferometer according to claim 2, wherein
the correction unit corrects an error in relative inclination between reflected light reflected off the movable mirror and reflected light reflected off the stationary mirror by inclining the stationary mirror, and
an angle formed by an optical axis of the reference light and an optical axis of the measurement light is larger than a maximum value of an inclination angle by which the stationary mirror can be inclined by the correction unit.

5. The interferometer according to claim 1, wherein
an angle of incidence of the collimated light on the stationary mirror is not more than a maximum value of an inclination angle by which, within a light beam of the measurement light that becomes incident on the movable mirror when positioned at a most distant possible position from the beam splitter, the collimated light becoming incident on the movable mirror is inclined.

6. An interferometer, comprising:
a measurement optical system in which measurement light from a measurement light source is split by a beam splitter into light beams, which are guided to a movable mirror and to a stationary mirror, respectively, and the light beam reflected off the movable mirror and the light beam reflected off the stationary mirror are combined by the beam splitter into measurement interference light, which is guided to a measurement light photodetector; and
a reference optical system in which reference light from a reference light source is split by the beam splitter into light beams, which are guided to the movable mirror and to the stationary mirror, respectively, and the light beam reflected off the movable mirror and the light beam reflected off the stationary mirror are combined by the beam splitter into reference interference light, which is guided to a reference light photodetector,
the interferometer performing measurement of the measurement interference light while, based on a detection result of the reference photodetector, detecting a position of the movable mirror,
wherein
the reference light source is constituted by a semiconductor laser or a laser light source that outputs laser light emitted from the semiconductor laser via a waveguide or a fiber,
the reference optical system has a collimator optical system for reference light that converts laser light emitted from the reference light source into collimated light, and
the collimated light becomes obliquely incident on the stationary mirror,
the measurement optical system has a collimator optical system for measurement light that converts the measurement light into collimated light, and
assuming that, when the movable mirror is at a most distant possible position from the beam splitter, a distance from the collimator optical system for measurement light to the position of the movable mirror is indicated as f, and a light beam size of light collimated at the collimator optical system for measurement light is indicated as e,
an angle of incidence of collimated light of the reference optical system on the stationary mirror is smaller than an angle corresponding to a ratio e/f.

7. The interferometer according to claim 2, wherein the correction unit comprises:
a signal processing part that, based on a detection result of the reference light photodetector, detects an error in relative inclination between reflected light reflected off the movable mirror and reflected light reflected off the stationary mirror;
an optical path correction mechanism that corrects an optical path of light reflected off the movable mirror or the stationary mirror by inclining the movable mirror or the stationary mirror; and
a control part that, based on the error in inclination detected at the signal processing part, controls the optical path correction mechanism.

8. The interferometer according to claim 2, wherein
the reference light photodetector is constituted by a division sensor, and
based on an output from each of elements constituting the division sensor, the correction unit detects an error in relative inclination between reflected light of the measurement light reflected off the movable mirror and reflected light of the measurement light reflected off the stationary mirror.

9. The interferometer according to claim 2, wherein
the measurement optical system has a collimator optical system for measurement light that converts the measurement light into collimated light, and
a light beam size of reference light converted into collimated light by the collimator optical system for reference light is smaller than a light beam size of measurement light converted into collimated light by the collimator optical system for measurement light.

10. A Fourier-transform spectroscopic analyzer, comprising:
an interferometer, comprising:
a measurement optical system in which measurement light from a measurement light source is split by a beam splitter into light beams, which are guided to a movable mirror and to a stationary mirror, respectively, and the light beam reflected off the movable mirror and the light beam reflected off the stationary mirror are combined by the beam splitter into measurement interference light, which is guided to a measurement light photodetector; and
a reference optical system in which reference light from a reference light source is split by the beam splitter into light beams, which are guided to the movable mirror and to the stationary mirror, respectively, and the light beam reflected off the movable mirror and the light beam reflected off the stationary mirror are combined by the beam splitter into reference interference light, which is guided to a reference light photodetector,
the interferometer performing measurement of the measurement interference light while, based on a detection result of the reference light photodetector, detecting a position of the movable mirror,
wherein
the reference light source is constituted by a semiconductor laser or a laser light source that outputs laser light emitted from the semiconductor laser via a waveguide or a fiber,
the reference optical system has a collimator optical system for reference light that converts laser light emitted from the reference light source into collimated light, and
the collimated light becomes obliquely incident on the stationary mirror such that an optical path of the measurement light and an optical path of the reference light are not perfectly coaxial with each other; and
a computation part that performs sampling and a Fourier transform of an interferogram obtained as a result of the measurement light photodetector of the interferometer receiving the measurement interference light and thereby generates a spectrum of a wavelength contained in the measurement light.

11. The Fourier-transform spectroscopic analyzer according to claim 10, wherein the interferometer further comprises a signal generation part that, based on a detection result of the reference light photodetector in the reference optical system, generates a signal representing timing for sampling the interferogram, and
based on, with respect to an interferogram of measurement interference light obtained in a case where light having a particular wavelength is used as the measurement light, a deviation from the particular wavelength of a wavelength obtained by performing sampling of the interferogram at timing based on a signal from the signal generation part, followed by a Fourier transform, the computation part corrects the timing for sampling.

12. The Fourier-transform spectroscopic analyzer according to claim 10, wherein the measurement light is near infrared light or infrared light, and
the reference light is red light.

13. The interferometer according to claim 1, wherein:
the measurement optical system has a collimator optical system for measurement light that converts the measurement light into collimated light, and
assuming that, when the movable mirror is at a most distant possible position from the beam splitter, a distance from the collimator optical system for measurement light to the position of the movable mirror is indicated as f, and a light beam size of light collimated at the collimator optical system for measurement light is indicated as e,
an angle of incidence of collimated light of the reference optical system on the stationary mirror is smaller than an angle corresponding to a ratio e/f.

14. The interferometer according to claim 1, wherein:
the position of the movable mirror detected by the reference light photodetector regards a position of the movable mirror as a whole.

* * * * *